United States Patent [19]

Tsukamoto et al.

[11] Patent Number: 4,525,598
[45] Date of Patent: Jun. 25, 1985

[54] STEEL WIRE FOR USE IN STRANDED STEEL CORE OF AN ALUMINUM CONDUCTOR, STEEL REINFORCED AND PRODUCTION OF SAME

[75] Inventors: Takashi Tsukamoto; Chuzo Sudo; Kenji Aihara; Syozi Nishimura, all of Kitakyushu, Japan

[73] Assignee: Sumitomo Metal Industries, Ltd., Osaka, Japan

[21] Appl. No.: 435,413

[22] Filed: Oct. 20, 1982

[30] Foreign Application Priority Data

Jan. 12, 1982 [JP] Japan .................................. 57-3607
Jan. 12, 1982 [JP] Japan .................................. 57-3608
Jan. 21, 1982 [JP] Japan .................................. 57-8605
Jan. 22, 1982 [JP] Japan .................................. 57-9290
Jul. 22, 1982 [JP] Japan .............................. 57-126660

[51] Int. Cl.³ .......................... H01B 5/08; H01B 1/02
[52] U.S. Cl. .................................. 174/128 R; 174/130; 428/659; 428/653
[58] Field of Search ............... 428/659, 606, 607, 614, 428/653, 592; 148/12 B; 75/123 B, 126 J, 123 L, 124, 126 R, 126 Q; 174/128 R, 130

[56] References Cited

U.S. PATENT DOCUMENTS

| | | | |
|---|---|---|---|
| 2,001,319 | 5/1935 | Stanley | 174/128 R |
| 3,012,310 | 12/1961 | Godfrey | 428/659 |
| 3,240,570 | 3/1966 | Grimes et al. | 174/128 R |
| 3,259,487 | 7/1966 | Mueller et al. | 75/123 B |
| 3,676,578 | 7/1972 | Cahill | 174/128 R |
| 3,813,481 | 5/1974 | Adams | 174/130 |
| 4,048,794 | 9/1977 | Falcy et al. | 174/128 R |
| 4,436,954 | 3/1984 | Kaderjak et al. | 174/128 R |

OTHER PUBLICATIONS

Cubberly, W. H., et al.: *Metals Handbook*, Ninth Edition, vol. 1, Am. Soc. for Metals; pp. 124, 689, 694 TAY72A3 (1978).

*Primary Examiner*—L. Dewayne Rutledge
*Assistant Examiner*—John J. Zimmerman
*Attorney, Agent, or Firm*—Burns, Doane, Swecker & Mathis

[57] ABSTRACT

A galvanized high strength steel wire for use in stranded steel core of an aluminum conductor, steel reinforced is disclosed. The steel composition thereof consists, by weight, essentially of:

C: 0.4–1.2%,
Si: not more than 2.0%,
Mn: not more than 2.0%,
Al: not more than 0.1%,
Cr: 0–5.0%,
Cu: 0–1.0%,
Ni: 0–1.0%,
V: 0–0.5%,
Nb: 0–0.2%,
Ti: 0–0.2%,
Zr: 0–0.2%, with the balance iron with incidental impurities of which the amounts of P, S, N and oxygen are:
P: not more than 0.025%,
S: not more than 0.015%,
P+S: not more than 0.03%,
N: not more than 0.010%,
Oxygen: not more than 0.004%.

4 Claims, 14 Drawing Figures

ND PRODUCTION OF SAME

BACKGROUND OF THE INVENTION

1. Field of the Invention

This invention relates to an improved high tensile strength steel wire useful as steel strands of an aluminum conductor, steel reinforced (hereinafter referred to as "ACSR"), a composite construction of aluminum strands surrounding a stranded steel core, which is used for overhead transmission lines.

2. Prior Art of the Invention

Recently the conditions under which the ACSR used for overhead transmission lines must serve have become more severe, and the load, particularly the dynamic load, exerted on the conductors has increased. As a result, it has become essential to improve the mechanical properties, both static strength (e.g. tensile strength) and dynamic strength (e.g. fatigue performance), of the steel wire for use in the ACSR.

The following significant changes in service conditions contribute to the need for better performance characteristics.

(1) Nowadays many long distance overhead transmission lines pass over mountains. Therefore, the span between supports for the lines is longer than before and, also, the difference in height between supports is greater. This means that the weight of the conductor between supports is greater and, also, that the tension exerted on the conductor is greater.

(2) To meet the demand for more power the transmission capacity of the conductor has been increased by enlarging the diameter of the ACSR. This means that the line itself is heavier and this, too, increases the load and tension on the conductor.

(3) In bad weather, especially during the blizzards that often hit mountain areas, a conductor of large diameter accumulates more snow and ice on the surface of the conductor, and this gives more resistance to wind and snow and increases the load and tension on the conductor and, in addition, causes various kinds of vibration resulting in a complicated dynamic tension load on the conductor.

(4) When the conductor is used for ultra-high power transmission (e.g. 750 to 1,000 kV) a rise in temperature (sometimes up to 400°–500° C.) of the ACSR occurs due to the heat generated by electrical resistance (Joule heat).

Under the above-mentioned operating conditions, it is essential that the ACSR have high tensile strength and high resistance to fatigue, not only at normal temperature but also at high temperatures. The tensile strength at high temperatures will hereinafter be referred to as "high temperature strength".

The ACSR presently available are classified into two types. In one type the tension is loaded on both the stranded steel core and the aluminum strands surrounding the core; in the other the tension is held only by the stranded steel core and the aluminum strands are free from the tension. However, with the ACSR of the former type sometimes all the tension has to be held by the steel strands only, not by both the steel strands and the aluminum strands. This is because the length of the aluminum strands increases due to rise in temperature during transmission of electrical power. Therefore, it is not too much to say that the mechanical properties of the ACSR depend entirely on the mechanical properties of the steel strands.

In the prior art ACSR, the galvanized steel wire strand prescribed in JIS G 3537 has been used to prepare the stranded steel core. However, such steel wire does not meet the requirements necessary for enduring the severe service conditions mentioned in Items (1) through (4) above as to tensile strength, fatigue properties and other mechanical properties.

According to the findings of the inventors of this invention, a steel strand which has the following properties can serve satisfactorily as the stranded steel core of the ACSR under the above mentioned severe service conditions:

(a) A tensile strength of 130–260 kgf/mm$^2$, preferably 180–260 kgf/mm$^2$ which is higher than that of the conventional one. Such a high tensile strength is required to hold up under the high tension imposed on the conductor.

(b) Fatigue limit $\geq$ tensile strength (TS)$\times$0.19.

This fatigue limit is higher than that of the prior art, but such a high fatigue limit is necessary to reduce the risk of the conductor breaking or being damaged under severe service conditions.

(c) $TS_{(T)} \geq TS_{(R)} \times (1.42 - 0.0028T)$, preferably $TS_{(T)} \geq TS_{(R)} \times (1.29 - 0.0019T)$ wherein, $TS_{(T)}$ stands for a tensile strength at T° C. in the temperature range of 150° C. to 450° C., and $TS_{(R)}$ stands for the tensile strength at room temperature.

The above high temperature strength is necessary to ensure that tension on the conductor does not vary significantly at the time of rapid temperature rise of the ACSR.

(d) A proportion of breakage or cracking (hereinafter referred to as "fracture defective ratio") of not more than 50% in a winding test employing a winding radius of curvature of 3.0 times the radius, preferably 1.5 times the radius.

Improvement in winding and unwinding properties in comparison with those of the prior art, as in the above, is desirable so as to prevent the breaking or cracking of the steel wire strands during the production thereof and during the construction of overhead transmission lines.

BRIEF DESCRIPTION OF THE INVENTION

The inventors of this invention have carried out a series of experiments for the purpose of developing a new steel wire which may satisfy all the above requirements.

In general, tensile strength of steel may essentially be improved by increasing the carbon content of the steel. However, when the tensile strength is improved by increasing the carbon content, winding and unwinding properties and fatigue properties are impaired. After an intensive study of this problem, the inventors found that the deterioration in winding and unwinding properties and fatigue properties, which is caused by the increase in tensile strength (i.e. the increase in carbon content), will effectively be prevented by restricting the amounts of P, S, N and oxygen respectively, to a level much lower than that of the prior art.

Namely, according to this invention, since the P content has a significant effect on the winding and unwinding properties of steel wires and the S content has a substantial effect on the fatigue properties and winding and unwinding properties, the respective amounts of P and S in steel are made smaller than in the prior art steel wire and the total amount of P plus S is also reduced. Furthermore, the respective amounts of N and oxygen are also substantially reduced, since even a small amount of N and/or oxygen results in significant deterioration of the above mentioned properties of steel wires.

Thus, according to this invention in which the respective amounts of P, S, N and Oxygen are restricted to a lower level, despite the increase in tensile strength, degradation in winding and unwinding properties and fatigue properties can effectively be prevented, and rather these properties may be improved to a significant extent.

The inventors also found that, in addition to some degree of improvement in high temperature strength resulting from the increase of tensile strength itself, increasing the Si content is very effective to improve high temperature strength. The addition of a suitable amount of Cr is also effective for this purpose. According to this invention, the addition of a suitable amount of other alloying elements, such as Cu, Ni, V, Nb, Ti, Zr etc is also highly effective to further improve the dynamic strength as well as static strength of the steel.

The inventors of this invention have also conducted a series of experiments to determine the effect of manufacturing conditions on the fatigue properties and torsional properties of a galvanized steel wire. In order to prevent the breakage or cracking of the steel wire strands during the production thereof and during the construction of overhead transmission lines, it is necessary to provide the galvanized steel wire with improved torsional properties represented by, e.g. a torsion repeating number of 20 or larger. The torsion repeating number means the number of times torsion is repeatedly applied to the wire at two points separated by a space 100 times the wire diameter until breakage or cracking of the wire occurs.

In general, the production lines of the galvanized steel wire for use in the ACSR comprises the steps of: applying a patenting treatment to a hot rolled steel wire to provide an austenite phase and then a pearlite structure; applying a lubricant to the surface of the resulting steel wire; after pickling, drawing the lubricated wire to provide a steel wire having a predetermined diameter and mechanical properties; and then galvanizing the steel wire to provide a galvanized steel wire product.

In respect to these manufacturing conditions, the inventors of this invention have found that the crystal grain size of the austenite structure, the interval between the lamellae of the pearlite structure and decarburizing conditions during patenting treatment play an important role in producing a galvanized steel wire having improved fatigue properties as well as improved torsional properties.

The inventors also found that galvanizing conditions including the bath temperature and a processing period of time have a remarkable effect on the mechanical properties of the resulting galvanized steel wire.

Further, the inventors of this invention have found that the amount of primer lubricant applied to the surface of the steel wire prior to the drawing has a close relationship with the fatigue properties of the resulting galvanized steel wire. It is herein to be noted that the lubricating treatment, in general, comprises applying after pickling a primer lubricant containing zinc phosphate (e.g. Bonderite, a tradename of Nihon Parker K. K.), and then a lubricant containing sodium stearate (e.g. Bondelube, a tradename of Nihon Parker K. K.) to form a layer of sodium stearate between the two layers of lubricant.

SUMMARY OF THE INVENTION

Thus, this invention resides in a galvanized high strength steel wire for use in stranded steel core of an aluminum conductor, steel reinforced, the steel composition of which consists, by weight, essentially of:
C: 0.4–1.2%,
Si: not more than 2.0%,
Mn: not more than 2.0%,
Al: not more than 0.1%,
Cr: 0–5.0%,
Cu: 0–1.0%,
Ni: 0–1.0%,
V: 0–0.5%,
Nb: 0–0.2%,
Ti: 0–0.2%,
Zr: 0–0.2%,
with the balance iron with incidental impurities of which the amounts of P, S, N and oxygen are:
P: not more than 0.025%,
S: not more than 0.015%,
P+S: not more than 0.03%,
N: not more than 0.010%, and
Oxygen: not more than 0.004%.

Preferably, the steel wire exhibits a tensile strength of 180 kgf/mm$^2$ or more and a fatigue strength of 40 kgf/mm$^2$ or more and the carbon content is 0.6–1.2%, N not more than 0.005% and oxygen not more than 0.002%.

This invention also resides in a method of producing a galvanized high strength steel wire for use in stranded steel core of an aluminum conductor, steel reinforced, which comprises preparing a steel wire the steel composition of which consists, by weight, essentially of:
C: 0.4–1.2%,
Si: not more than 2.0%,
Mn: not more than 2.0%,
Al: not more than 0.1%,
Cr: 0–5.0%,
Cu: 0–1.0%,
Ni: 0–1.0%,
V: 0–0.5%,
Nb: 0–0.2%,
Ti: 0–0.2%,
Zr: 0–0.2%,
with the balance iron with incidental impurities of which the amounts of P, S, N and oxygen are:
P: not more than 0.025%,
S: not more than 0.015%,
P+S: not more than 0.03%,
N: not more than 0.010%, and
Oxygen: not more than 0.004%;
applying patenting treatment to the resulting steel wire to provide an austenitic structure having an austenitic grain size of 20–60 μm, then to effect transformation of the austenitic structure to a pearlite structure; and after pickling and lubricating, carrying out the drawing of the steel wire with a reduction in area of 70–95%.

Preferably, the galvanizing treatment is carried out at a bath temperature of 450° C. or lower for 15 seconds or less to provide a galvanized steel wire with an Fe-Zn alloy layer 15 μm or less thick. The thus obtained galvanized steel wire can exhibit a tensile strength of 180 kgf/mm$^2$ or more and a fatigue strength of 40 kgf/mm$^2$ or more. It is more advantageous to cool the galvanized steel wire within 5 seconds after the finishing of the galvanizing treatment.

In a preferred embodiment, an interval between the lamellae of the pearlite structure is adjusted to not larger than 0.20 μm prior to the drawing.

In a further preferred embodiment, the patenting treatment is the lead patenting treatment in which the decarburizing of the steel wire to be treated is carried out so that the total decarburized depth is not less than 150 μm and the decarburized depth in ferrite layer is not less than 50 μm.

In another embodiment of this invention, a primer lubricant containing a zinc phosphate is applied to the surface of the wire in an amount of 3–7 g/m² after pickling.

DESCRIPTION OF PREFERRED EMBODIMENT OF THIS INVENTION

Figure 1:
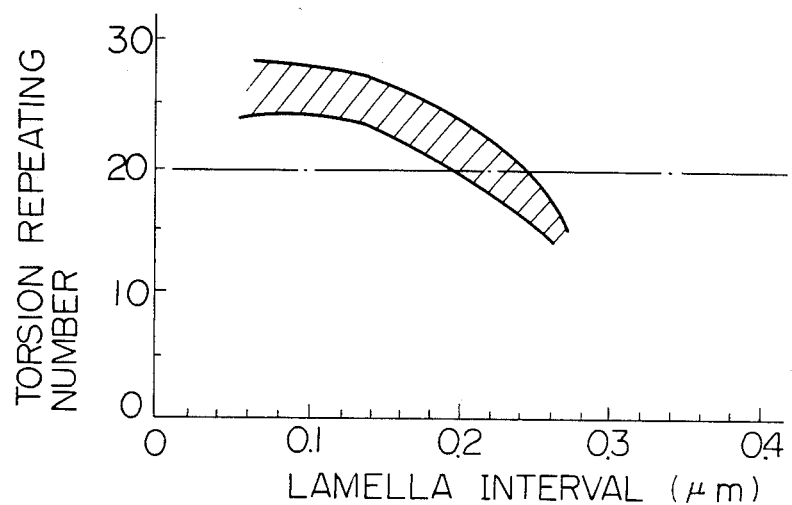
FIG. 1 shows the relationship between the torsion repeating number and the lamella interval of a galvanized steel wire.

Detailed reasons for defining the steel composition of this invention as in the above will be given below.

Carbon (C): Carbon is effective to ensure tensile strength necessary for a heat-resistant, high tensile steel wire. When the carbon content is less than 0.4%, an intended level of tensile strength, i.e. 130–260 kgf/mm², cannot be achieved. When the content is over 1.2%, the winding and unwinding properties of the wire are adversely affected. Thus, according to this invention the carbon content is defined as 0.4–1.2%. Preferably, the carbon content is restricted to 0.6–1.2% so as to achieve a tensile strength of 180 kgf/mm² or higher.

Silicon (Si): Silicon is an alloying element necessary to improve fatigue properties and high temperature strength of high-carbon, high tensile steel wire. However, when the amount of Si is over 2.0%, ductility thereof remarkably reduces, and the winding and unwinding properties are adversely affected.

Manganese (Mn): Manganese is effective to improve tensile strength of steel wires having a large diameter. The incorporation of a large amount of Mn, however, makes the crystal grains of the pearlite structure rather coarse, resulting in reduction in strength. Particularly, when Mn is over 2.0%, it is difficult to ensure the necessary level of tensile strength. Thus, the upper limit of Mn is defined as 2.0% in this invention.

Phosphorus (P): Phosphorus has a strong influence on winding and unwinding properties. It is necessary to restrict the P content to an extremely low level for a high carbon steel wire, winding and unwinding properties of which degrade with increase in tensile strength. Thus, the P content should be kept at a low level so as not only to prevent the degradation in winding and unwinding properties, but also to ensure a sufficient degree of winding and unwinding properties.

A relatively large amount of P is usually present in high carbon steel, because the P once moved into the slag comes back to the melt during refining of steel. However, when the P content is over 0.025%, it is rather difficult to provide the necessary degree of winding and unwinding properties. Thus, the proportion of P is restricted to not more than 0.025% in this invention.

Sulfur (S): Sulfur also has an extremely adverse effect on winding and unwinding properties and fatigue properties of the wire. The winding and unwinding properties and fatigue properties of high carbon steel are degraded as the tensile strength increases, so, to prevent degradation of these properties and also to ensure the necessary degree of these properties, it is necessary to restrict the S content to an extremely low level. Usually, the sulfur content of a high carbon steel is about 0.02%. However, when the S content is over 0.015%, winding and unwinding properties as well as fatigue properties deteriorate beyond the point of no return and cannot be restored. The S content, therefore, is limited to not more than 0.015% in this invention.

P+S: When the total amount of P plus S is over 0.03%, it is difficult to ensure the necessary degree of winding and unwinding properties as well as fatigue properties. Therefore, according to this invention, the total amount of P plus S is limited to not more than 0.03%. In order to further improve the winding and unwinding properties as well as fatigue properties, the total amount of P plus S is preferably limited to not more than 0.028%.

Nitrogen (N): Nitrogen has an unfavorable influence on winding and unwinding properties. The less nitrogen the better. When the proportion of nitrogen is over 0.01%, winding and unwinding properties sometimes deteriorate markedly. Therefore, the amount of N is restricted to not more than 0.01%, preferably not more than 0.005% in this invention.

Oxygen: Oxygen has a remarkable effect on both winding and unwinding properties and fatigue properties. When the amount of oxygen is over 0.004%, the fracture defective ratio is over 50% in a winding test employing a winding radius of 3.0 times the wire diameter (hereinafter referred to as "3.0 times diameter winding test") and the fatigue limit is less than the value of TS (Tensile Strength)×0.19 for a high carbon steel wire exhibiting a tensile strength of 130 kgf/mm² or more. Therefore, the amount of oxygen is restricted to not more than 0.004%. In this respect, it is to be noted that the fracture defective ratio of the 3.0 times diameter winding test is 0% and that of the 1.5 times diameter winding test is 50% for the wire in which the oxygen content is restricted to within the range 0.004–0.0025%. In addition, when the amount of oxygen is restricted to not more than 0.0025%, preferably not more than 0.0020%, the fracture defective ratio of the 1.5 times diameter winding test is 30% or less. Thus, it is preferable to reduce the amount of oxygen to as a small amount as possible. The oxygen content may preferably be reduced to not more than 0.0016%.

Chromium (Cr): Chromium is effective to improve tensile strength, and it is especially effective in improving tensile strength of steel wires having a large diameter. The addition of Cr also remarkably improves high temperature strength. However, when the amount of Cr is over 5.0%, it is rather difficult to ensure the necessary degree of winding and unwinding properties as well as fatigue properties. Thus, the proportion of Cr, when it is added, is restricted to not more than 5.0% in this invention.

Copper (Cu) and Nickel (Ni): These optional alloying elements have an effect similar to that of Mn. They may improve hardenability of a large diameter steel wire to enhance tensile strength as well as ductility. However, when they are added in an amount of over 1.0% of each, respectively, the crystal grain of the pearlite structure becomes coarse, impairing tensile strength as well as ductility of the resulting steel wire. In addition, when more than 1.0% of each is added, it takes long time to complete the transformation, frequently resulting in a lot of trouble in the succeeding patenting treatment step. Thus, the proportions of Cr and Ni, when they are added, are restricted to not more than 1.0%, respectively.

Vanadium (V), Niobium (Nb), Titanium (Ti) and Zirconium (Zr): These optional alloying elements are effective to provide a steel having a fine and enhanced crystal structure. They are especially effective in improving winding and unwinding properties of high carbon steel wire having high tensile strength. However, when V is over 0.5%, and Nb, Ti and Zr are over 0.2%, respectively, the amount of coarse carbides of these elements (i.e. V, Nb, Ti and Zr) which remain undissolved, increases, and it offsets the improvement rendered by the addition of these elements regarding winding and unwinding properties, rather impairing these properties. Therefore, according to this invention, the amount of V is restricted to not more than 0.5%, and the amounts of Nb, Ti and Zr are restricted to not more than 0.2%, respectively.

According to one embodiment of this invention, the thickness of an Fe-Zn alloy layer formed during galvanizing may be restricted to not more than 15 μm. This value is much smaller than that of the conventional product. In the prior art the thickness is usually 20–25 μm. It is desirable in this invention to make the Fe-Zn alloy layer as thin as possible in order to further improve fatigue strength. Due to the synergistic effect with the steel composition of this invention, a fatigue strength of 40 kgf/mm² or more, advantageously 44 kgf/mm² or more can be obtained when the thickness of Fe-Zn alloy is restricted to not more than 15 μm.

It is possible to restrict the alloy thickness to not more than 15 μm, by employing a low bath temperature or by carrying out the galvanizing for a short time. For this purpose, according to a preferred embodiment of this invention, the galvanizing treatment may be carried out at a bath temperature of 450° C. or less for a period of 15 seconds or less.

According to our experiments carried out using a steel wire having alloy composition given below a fatigue strength of 40 kgf/mm² or more may advantageously be obtained preferably by restricting the thickness of Fe-Zn alloy to 18 μm or less, usually to 15 μm or less. In addition, in order to obtain Fe-Zn alloy 15 μm or less thick, it is advisable to carry out the galvanizing at a bath temperature of 450° C. or less for 15 seconds or less.

In this respect, the inventors of this invention also found that the Fe-Zn alloy layer grows to 15 μm thick within 5 seconds after the galvanizing. This means that after this point it is preferable to prevent the formation of Fe-Zn alloy layer for the purpose of this invention. Thus, it is advisable to cool the galvanized steel wire with water in order to prevent the growth of Fe-Zn alloy layer within 5 seconds after finishing the galvanizing.

TABLE 1

| C | Si | Mn | Al | P | S | N | O |
|---|----|----|----|---|---|---|---|
| 0.82 | 0.27 | 0.75 | 0.034 | 0.017 | 0.010 | 0.004 | 0.001 |

In addition, according to this invention, it is preferable to reduce the grain size of the austenite structure so as to further improve the fatigue strength. However, the torsional properties rather deteriorate as the grain size becomes small. Therefore, in another preferred embodiment of this invention, it is advisable to adjust the grain size of the austenitic structure to within the range of 20–60 μm. In this respect, the grain size of the conventional austenitic structure is 100 μm, which is much larger than that in the above.

FIG. 1 shows the relationship between the torsion repeating number and the lamella interval of a galvanized steel wire having the alloy composition given in Table 1 above. The graphs shown therein were obtained on the basis of data from a series of experiments, and these graphs show the general tendency of the above relationship and are not to restrict the scope of this invention. As is apparent from the graphs shown therein, it is advisable to adjust the lamella interval to 0.24 μm or less, preferably to 0.20 μm or less so as to obtain the torsion repeating number of 20 or more. The grain size of the austenitic structure was about 97 μm.

The adjustment of the austenitic grain size and the interval of lamellae of the pearlite structure may easily be effected or carried out, in general, by means of optimizing the steel composition for this purpose and by means of balancing the manufacturing conditions. For example, those values of grain size and of the interval can effectively be controlled in the lead patenting treatment by suitably controlling the heating temperature, heating rate and time, and lead bath temperature. When a patenting treatment other than the lead patenting, e.g. direct patenting in which the hot rolled steel wire is subjected to controlled cooling, is employed, the austenitic grain size and the interval of lamellae of the pearlite structure may be adjusted by means of employing controlled rolling in which the steel composition, hot rolling conditions etc. are optimized.

The measures of adjusting the grain size and the interval of pearlite lamellae as in the above has been well known in the art. When the draw ratio evaluated in terms of reduction area is less than 70%, it is difficult to obtain the intended level of tensile strength of 180 kgf/mm² or higher as well as the target level of an endurance ratio of 0.19 or higher even for carbon steel (C: 0.6–1.2%) as well as for low alloy steel. On the other hand, when the draw ratio is over 95%, the fatigue strength markedly reduces and the endurance ratio becomes smaller than 0.18. In addition, winding and unwinding properties are adversely affected. Furthermore, when the draw ratio is over 95%, often the twisting is not uniformly propagated through the wire in the torsion test, causing abnormal or sudden breaking of the wire at an extremely small number of torsion repeatedly exerted to the wire.

According to a preferred embodiment of this invention, therefore, the austenite grain size of the austenitic structure may be adjusted to 20–60 $\mu$m and the interval between lamellae of the pearlite structure may also be adjusted to 0.20 $\mu$m or less during patenting treatment in order to further improve the dynamic fatigue properties. The reduction in area during drawing is also adjusted to 70–95% for this purpose.

Figure 2:
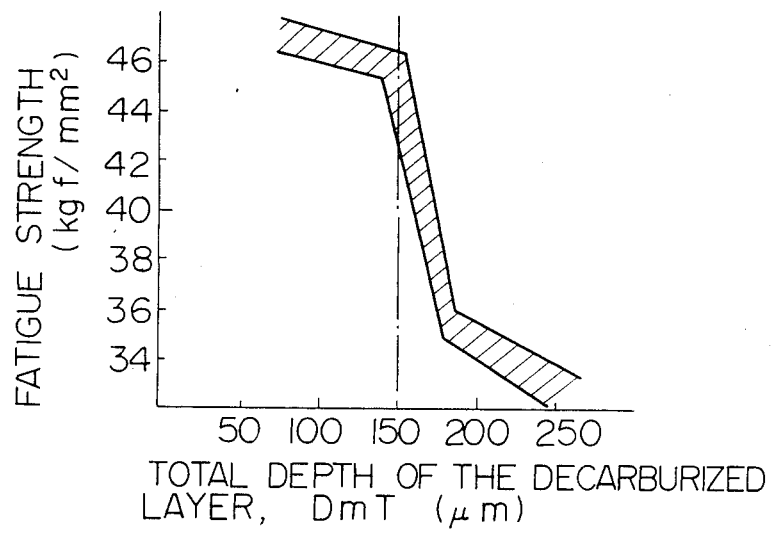
FIG. 2 shows the relationship between the total depth of the decarburized layer ($D_mT$) and the fatigue strength of a galvanized steel wire.
Figure 3:
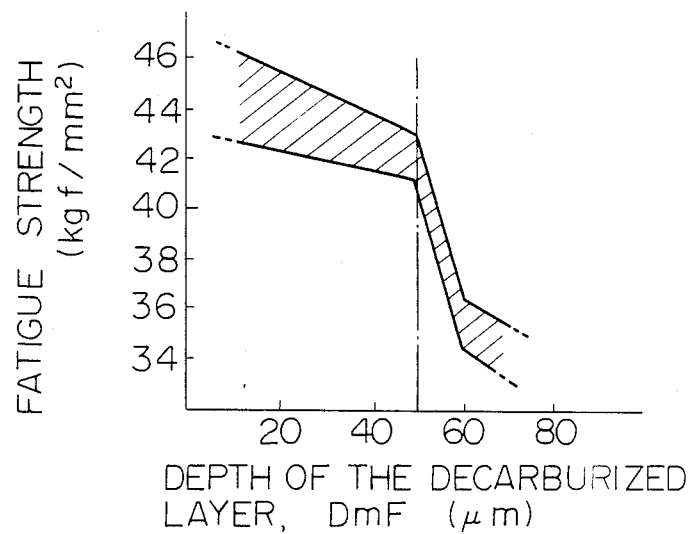
FIG. 3 shows the relationship between the depth of the decarburized layer of ferrite phase ($D_mF$) and the fatigue strength of a galvanized steel wire.

In a further preferred embodiment of this invention, the method of this invention may employ a lead patenting process. As mentioned hereinbefore, the degree of decarburization in the surface area of steel wire after lead patenting has a close relation to the fatigue strength of the resulting wire. The total depth of a decarburized layer including a partially decarburized portion ($D_mT$) and the decarburization depth of ferrite phase ($D_mF$) are plotted with respect to the fatigue strength of the resulting galvanized steel wire in FIGS. 2 and 3, respectively. These experimental data were obtained by using the steel composition shown in Table 1 and the hot rolled steel wire was galvanized at a bath temperature of 450° C. for 12 seconds. When the $D_mT$ is over 150 $\mu$m and/or when the $D_mF$ is over 50 $\mu$m, a fatigue strength higher than 40 kgf/mm² was not obtained.

The control of the decarburizing depth can be carried out by adjusting the processing conditions of the lead patenting treatment. In general, it is advisable for this purpose to control the heating temperature and holding time and, if necessary, the atmosphere (i.e. fuel/air ratio etc.). It may be said that decarburization may be suppressed by employing a low heating temperature and a short holding time and also by reducing the amount of oxygen in the atmosphere. Either of these measures may be employed to control the decarburization without adversely affecting the lead patenting process and its effect.

In this respect, according to the conventional method of lead patenting treatment, the $D_mT$ is usually 170–200 $\mu$m, which is much higher than the upper limit of the $D_mT$ in a preferred embodiment of this invention. In addition, the $D_mF$ of the conventional method is 60–70 $\mu$m, which is also much higher than that of this invention.

Furthermore, when the amount of primer lubricant applied to the surface of the steel wire prior to the drawing is less than 3 g/m², the lubricant cannot exhibit its own lubricating properties, but sometimes results in baking during drawing. As long as the amount of the primer lubricant is not more than 7 g/mm², an endurance ratio in the most preferred range can be obtained. In this respect, the conventional method employs the primer lubricant in an amount of more than 10 g/m². It was thought that the primer lubricant is applied only for the purpose of serving itself as lubricant so as to avoid the occurrence of baking during drawing. This is the reason why such a large amount of primer lubricant is applied in the prior art.

The following examples are presented as specific illustations of the claimed invention. It should be understood, however, that this invention is not limited to the specific details set forth in the examples.

EXAMPLE 1

A series of steel composition shown in Table 2 below were prepared using a 4-ton electric furnace and were hot rolled to steel wires 8.0 mm in diameter. These wires were subjected to lead patenting treatment at a heating temperature of 900° C. The grain size of the austenitic structure was 30 $\mu$m, the lamella interval of the pearlite structure after patenting was 0.15 $\mu$m, the total depth of decarburized layer ($D_mT$) was 50 $\mu$m and the decarburized depth in the ferrite structure was zero.

After patenting, the resulting steel wires were subjected to pickling and lubricating so that primer lubricant comprised of zinc phosphate was applied in an amount of about 6 g/m². The thus lubricated steel wires were then continuously drawn to wires 3.11 mm in diameter. The reduction in area was 85.9%.

The galvanizing treatment was applied at a zinc plating bath temperature of 450° C. for 12 seconds. Four seconds after finishing the galvanizing treatment, the galvanized steel wire was quenched with water.

Mechanical properties of the resulting steel wires were determined. The experimental data are summarized in FIGS. 4 through 14.

Figure 4:
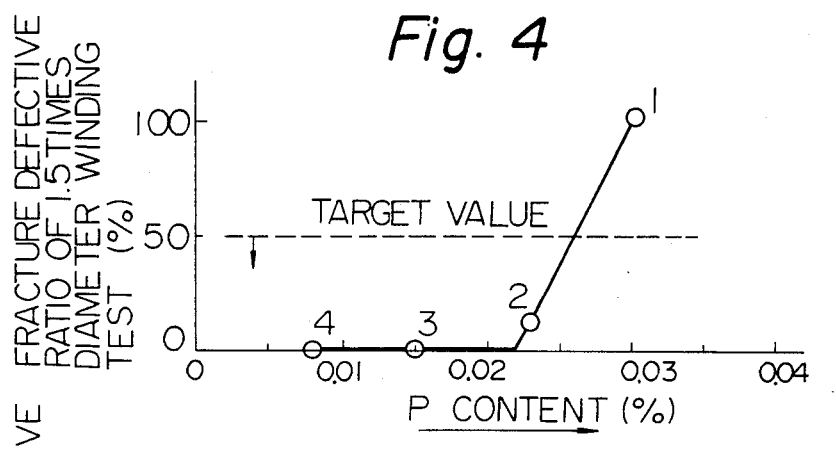
FIG. 4 shows the relationship between the fracture defective ratio of the 1.5 times winding test and the P content.

FIG. 4 shows the relationship between the P content and the fracture defective ratio of the 1.5 times diameter winding test for steel wires having Steel Composition No. 1 (hereunder merely as Steel No. 1 and so on), which contains a relatively large amount of P and for Steel Nos. 2, 3 and 4 each of which has a relatively small amount of P. As is apparent from the graph shown therein, the fracture defective ratio rapidly increases when the P content is over 0.022%. Steel No. 1 which contains 0.031% of P shows a fracture defective ratio of 100%. However, the invention steels, each of which contains P in an amount of 0.025% or less, all show a relatively low level of the fracture defective ratio.

Figure 5:
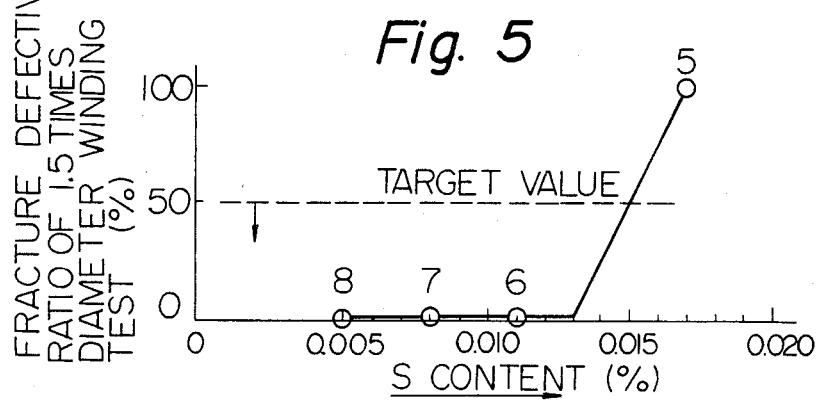
FIG. 5 shows the relationship between the fracture defective ratio of the 1.5 times winding test and the S content.

FIG. 5 shows the relationship between the fracture defective ratio and the S content for steel No. 5 in which the S content is rather high and Steel Nos. 6, 7 and 8 which contain a relatively small amount of S. As is apparent from the data shown in FIG. 5, the fracture defective ratio of the 1.5 times diameter winding test increases rapidly after the point of 0.012% of S. When the S content is over 0.015%, the ratio is over 50% and the ratio is 100% for Steel No. 5. Thus, the winding and unwinding properties deteriorate with increase in the S content.

Figure 6:
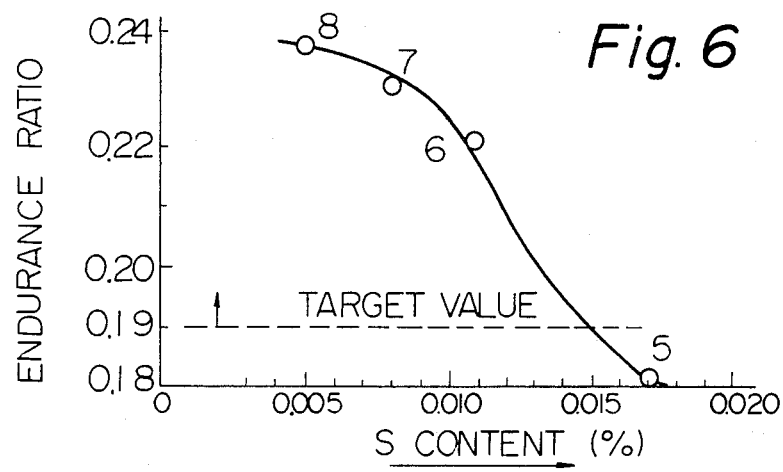
FIG. 6 shows the relationship between the endurance ratio of the fatigue test and the S content.

FIG. 6 shows the relationship between the S content and the endurance ratio of the fatigue test for Steel Nos. 5–8. FIG. 6 shows that the endurance ratio is 0.19 or less when the S content is 0.015% or higher. The ratio for the comparative steel (Steel No. 5) which contains 0.017 % of S is 0.18, which is much smaller than the target value of the endurance ratio of this invention.

Figure 7:
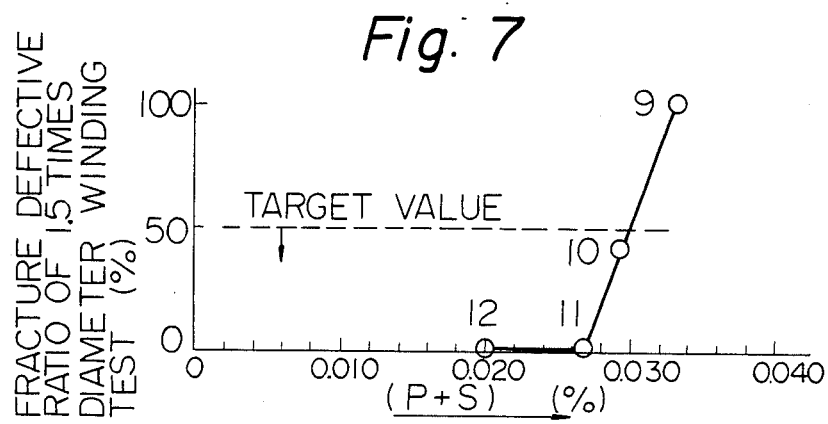
FIG. 7 shows the relationship between the fracture defective ratio of the 1.5 times winding test and the total amount of (P+S)

FIG. 7 shows the relationship between the amount of (P+S) and the fracture defective ratio for Steels No. 9 in which the total amount of (P+S) is relatively large and Steel Nos. 10-12 in which the (P+S) is relatively small. When the amount of (P+S) goes beyond 0.027%, the ratio rapidly increases and is 50% or more after the point of 0.030% of (P+S). The purpose of this invention cannot be achieved when the total amount of (P+S) is higher than 0.030%.

Figure 8:
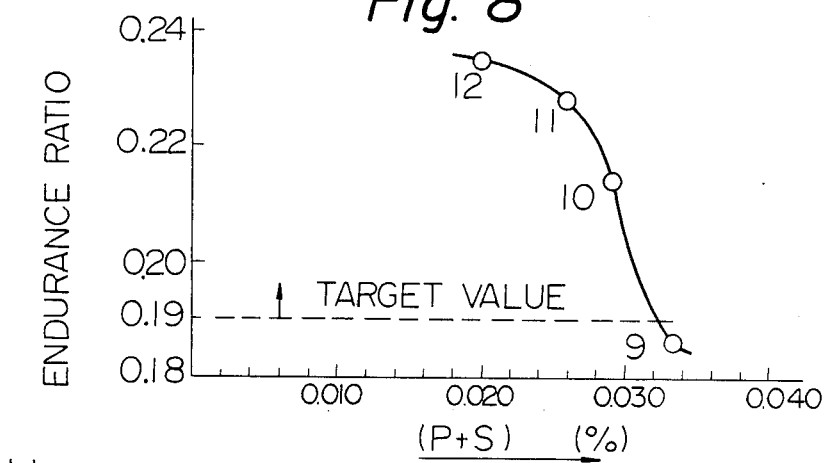
FIG. 8 shows the relationship between the endurance ratio of the fatigue test and the total amount of (P+S)

FIG. 8 shows the amount of (P+S) and the endurance ratio of the fatigue test for Steel Nos. 9-12. When the total amount of (P+S) goes beyond the point of 0.030%, the endurance ratio is less than 0.19. The comparative one in which the total content of (P+S) is 0.033% cannot provide the target value of the endurance ratio of this invention.

Figure 9:
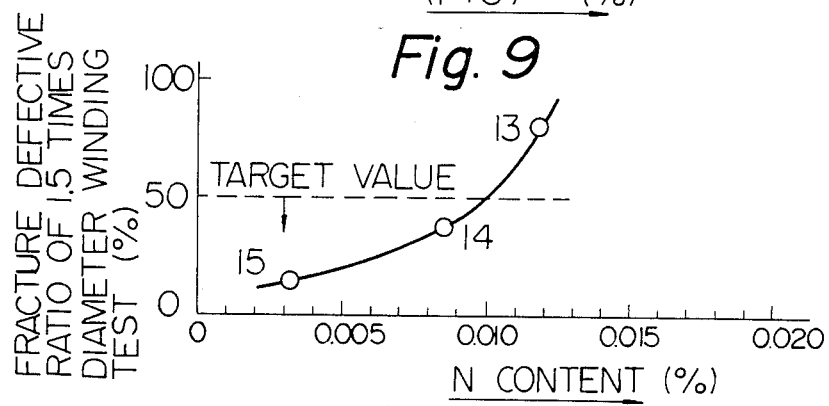
FIG. 9 shows the relationship between the fracture defective ratio of the 1.5 times diameter winding test and the N content.

FIG. 9 shows the relationship between the fracture defective ratio of the 1.5 times diameter winding test and the N content for Steel No. 13 which contains a relatively large amount of N and Steel Nos. 14 and 15 which contain a relatively small amount of N. As shown in the graph, the defective ratio becomes 50% or higher when the N content goes beyond the point of 0.010%. The comparative one in which the N content is 0.0119%, the purpose of this invention cannot be achieved.

Figure 10:
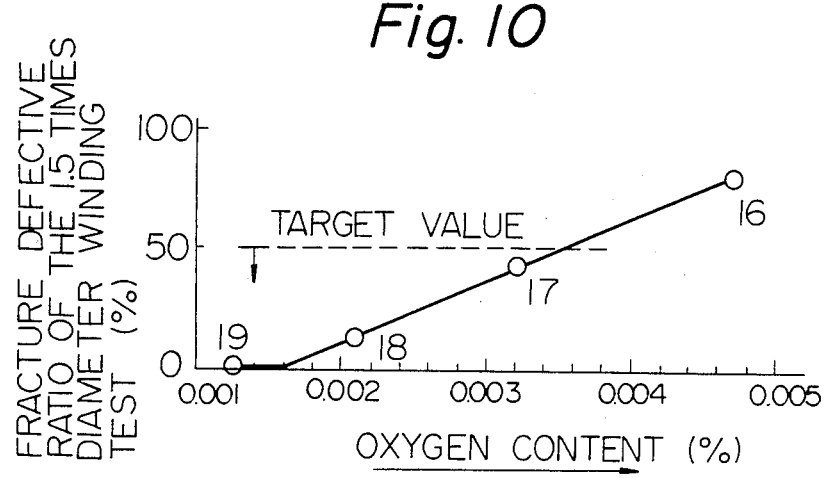
FIG. 10 shows the relationship between the fracture defective ratio of the 1.5 times diameter winding test and the oxygen content.

FIG. 10 shows the relationship between the fracture defective ratio of the 1.5 times diameter winding test and the oxygen content of the steel for Steel No. 16 which contains a relatively large amount of oxygen and Steel Nos. 17-19, which contain oxygen in an amount within the range defined in this invention. As is apparent from the data shown therein, the fracture defective ratio, gradually increases after the point of 0.0016% of oxygen, and the comparative one containing 0.0047% of oxygen cannot provide the target value of the fracture defective ratio of this invention.

Figure 11:
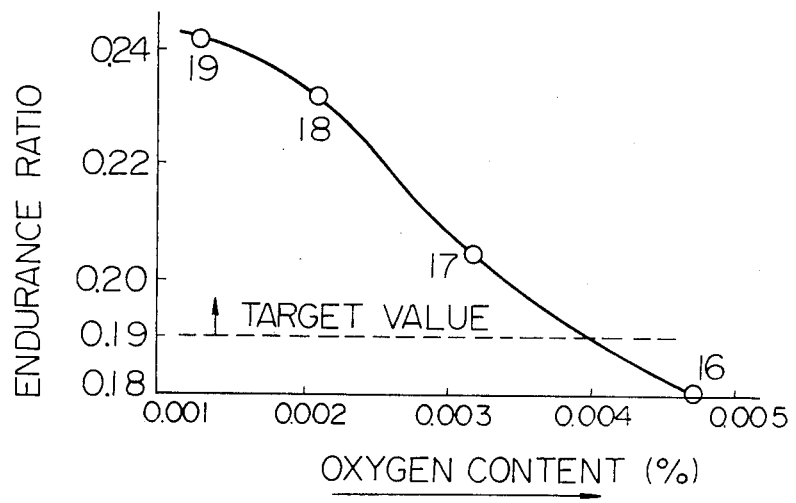
FIG. 11 shows the relationship between the endurance ratio of the fatigue test and the oxygen content.

FIG. 11 shows the relationship between the endurance ratio of the fatigue test and the oxygen content for Steel Nos. 16-19. As the oxygen content increases the ratio decreases. After the point of 0.004% of oxygen, the endurance ratio becomes 0.19 or less which is far below the intended value of this invention. Thus, Steel No. 16 cannot achieve the purpose of this invention.

Figure 12:
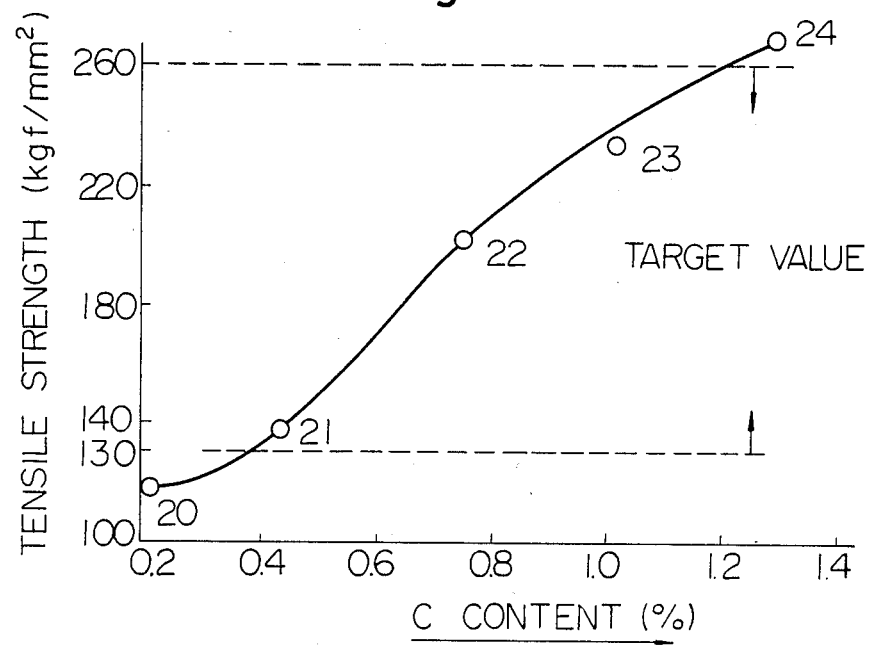
FIG. 12 shows the relationship between the tensile strength of the high temperature test and the C content.

FIG. 12 shows the relationship between the tensile strength of the high temperature tensile test and the C content for Steel No. 20 which contain a relatively small amount of carbon, Steel Nos. 21, 22 and 23 and Steel No. 24 which has an extremely large amount of carbon. As is apparent from the data shown therein, when the carbon content is less than 0.4% (see Steel No. 20), the tensile strength is 130 kgf/mm$^2$ or less. On the other hand, when the carbon content is over 1.2% (see Steel No. 24), the tensile strength is over 260 kgf/mm$^2$. However, the tensile strength of Steel Nos. 21, 22 and 23 falls within the range of this invention (i.e. 130-260 kgf/mm$^2$).

Figure 13:
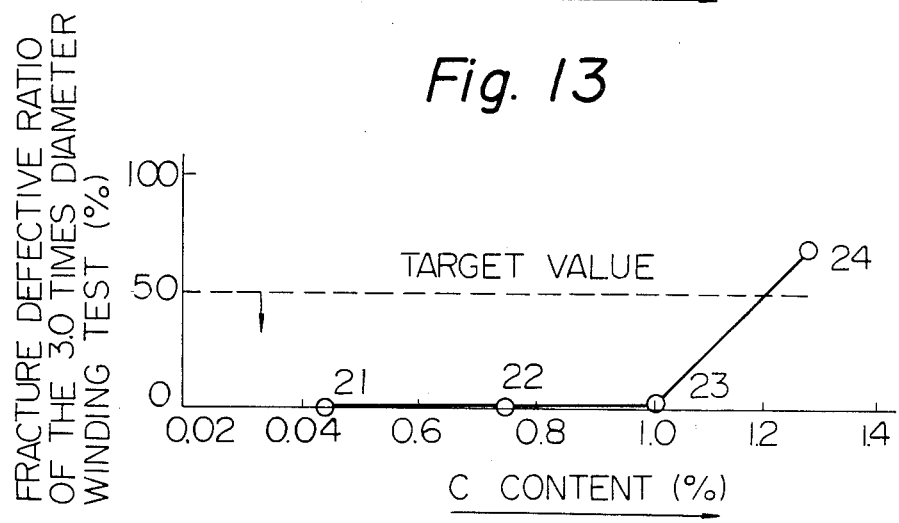
FIG. 13 shows the relationship between the fracture defective ratio of the 3.0 times diameter winding test and the carbon content.

FIG. 13 shows the relationship between the fracture defective ratio of the 3.0 times diameter winding test and the carbon content for Steel Nos. 21-24. When the carbon content goes beyond the point of 1.0%, the ratio increases rapidly and is 50% or more at the point of 1.2% or more of carbon. The Steel No. 24, which contains 1.28%C cannot achieve the purpose of this invention.

Figure 14:
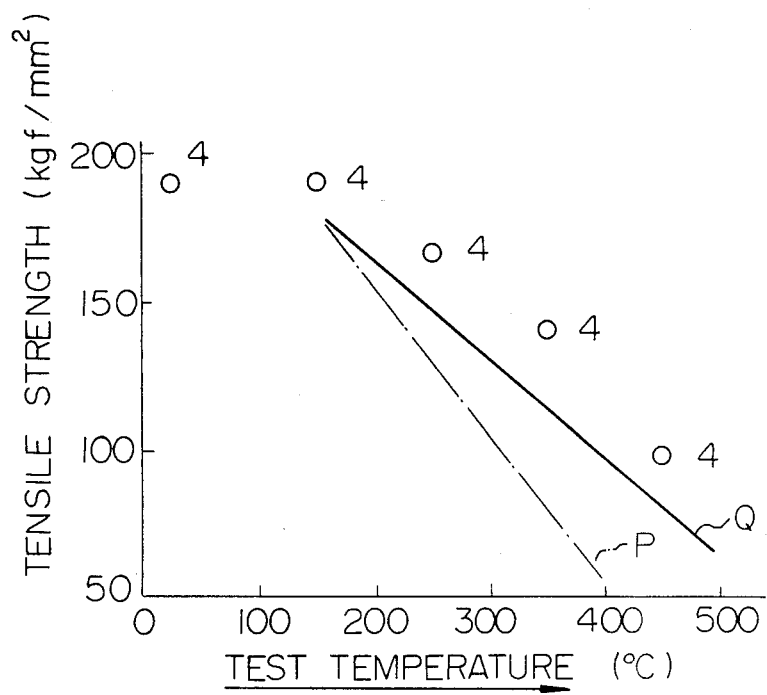
FIG. 14 shows the relationship between temperature and tensile strength.

FIG. 14 shows the relationship between the temperature and the tensile strength. Those data were obtained by carrying out high temperature tensile strength test using Steel No. 4, which is typical one of this invention steel. In the Figure, the Curve "P" shows the relation: $TS_{(T)} = TS_{(R)} \times (1.42 - 0.0028T)$ and the Curve "Q" shows the relation: $TS_{(T)} = TS_{(R)} \times (1.29 - 0.0019T)$.

The high temperature strength of this invention steel falls above the Curves "P" and "Q", showing that it has a satisfactory value of high temperature strength.

EXAMPLE 2

In this example, Example 1 was repeated except that the steel compositions are as shown in Table 3 below.

Mechanical properties of the resulting steel wires were determined. The experimental data are summarized in Table 4 below.

As is apparent therefrom, the mechanical properties of the invention steel wires are much superior to those of the comparative steel wires.

TABLE 2

| Steel No. | C | Si | Mn | P | S | P+S | Cr | V | Al | N | O | |
|---|---|---|---|---|---|---|---|---|---|---|---|---|
| 1 | 0.75 | 0.33 | 0.77 | 0.031 | 0.007 | 0.038 | — | — | 0.029 | 0.0065 | 0.0022 | Comparative |
| 2 | 0.73 | 0.32 | 0.81 | 0.023 | 0.007 | 0.030 | — | — | 0.022 | 0.0057 | 0.0025 | Invention |
| 3 | 0.76 | 0.33 | 0.80 | 0.015 | 0.007 | 0.022 | — | — | 0.030 | 0.0059 | 0.0029 | " |
| 4 | 0.77 | 0.32 | 0.79 | 0.008 | 0.008 | 0.016 | — | — | 0.026 | 0.0067 | 0.0023 | " |
| 5 | 0.74 | 0.36 | 0.86 | 0.022 | 0.017 | 0.039 | — | — | 0.035 | 0.0051 | 0.0025 | Comparative |
| 6 | 0.75 | 0.31 | 0.87 | 0.019 | 0.011 | 0.030 | — | — | 0.033 | 0.0058 | 0.0024 | Invention |
| 7 | 0.72 | 0.35 | 0.88 | 0.022 | 0.008 | 0.030 | — | — | 0.041 | 0.0062 | 0.0023 | " |
| 8 | 0.72 | 0.32 | 0.88 | 0.020 | 0.005 | 0.025 | — | — | 0.038 | 0.0058 | 0.0025 | " |
| 9 | 0.76 | 0.34 | 0.81 | 0.024 | 0.009 | 0.033 | — | — | 0.029 | 0.0047 | 0.0021 | Comparative |
| 10 | 0.77 | 0.31 | 0.83 | 0.022 | 0.007 | 0.029 | — | — | 0.029 | 0.0060 | 0.0020 | Invention |
| 11 | 0.82 | 0.27 | 0.75 | 0.017 | 0.010 | 0.027 | — | — | 0.034 | 0.0055 | 0.0023 | " |
| 12 | 0.74 | 0.30 | 0.80 | 0.014 | 0.006 | 0.020 | — | — | 0.036 | 0.0057 | 0.0020 | " |
| 13 | 0.71 | 0.36 | 0.77 | 0.022 | 0.007 | 0.029 | — | — | 0.002 | 0.0119 | 0.0027 | Comparative |
| 14 | 0.71 | 0.37 | 0.79 | 0.023 | 0.007 | 0.030 | — | — | 0.002 | 0.0085 | 0.0028 | " |
| 15 | 0.70 | 0.34 | 0.76 | 0.021 | 0.008 | 0.029 | — | — | 0.001 | 0.0032 | 0.0025 | " |
| 16 | 0.72 | 0.35 | 0.84 | 0.020 | 0.007 | 0.027 | — | — | 0.022 | 0.0042 | 0.0047 | Comparative |
| 17 | 0.73 | 0.38 | 0.84 | 0.019 | 0.009 | 0.028 | — | — | 0.019 | 0.0049 | 0.0032 | Invention |
| 18 | 0.73 | 0.36 | 0.81 | 0.020 | 0.008 | 0.028 | — | — | 0.018 | 0.0053 | 0.0021 | " |
| 19 | 0.72 | 0.37 | 0.85 | 0.019 | 0.008 | 0.027 | — | — | 0.020 | 0.0051 | 0.0012 | " |
| 20 | 0.22 | 0.81 | 0.32 | 0.018 | 0.005 | 0.023 | 0.72 | 0.09 | 0.037 | 0.0034 | 0.0018 | Comparative |
| 21 | 0.44 | 0.79 | 0.33 | 0.019 | 0.005 | 0.024 | 0.77 | 0.09 | 0.041 | 0.0046 | 0.0013 | " |
| 22 | 0.75 | 0.83 | 0.29 | 0.017 | 0.006 | 0.023 | 0.75 | 0.10 | 0.034 | 0.0039 | 0.0011 | " |
| 23 | 1.01 | 0.88 | 0.29 | 0.017 | 0.006 | 0.023 | 0.80 | 0.09 | 0.044 | 0.0050 | 0.0014 | " |

TABLE 2-continued

STEEL COMPOSITION (% by weight)

| Steel No. | C | Si | Mn | P | S | P + S | Cr | V | Al | N | O | |
|---|---|---|---|---|---|---|---|---|---|---|---|---|
| 24 | 1.28 | 0.84 | 0.27 | 0.018 | 0.005 | 0.023 | 0.79 | 0.09 | 0.036 | 0.0062 | 0.0024 | " |

TABLE 3

STEEL COMPOSITION (% by weight)

| Steel No. | C | Si | Mn | P | S | P + S | Cr | Ni | V | Nb | Al | N | O | Ti | Cu | Zr | Remarks |
|---|---|---|---|---|---|---|---|---|---|---|---|---|---|---|---|---|---|
| 25 | 0.22 | 0.32 | 0.81 | 0.018 | 0.005 | 0.023 | — | — | — | — | 0.037 | 0.0034 | 0.0018 | — | — | — | Comparative |
| 26 | 0.82 | 0.27 | 0.75 | 0.017 | 0.010 | 0.027 | — | — | — | — | 0.034 | 0.0040 | 0.0010 | — | — | — | This Invention |
| 27 | 1.01 | 0.29 | 0.88 | 0.017 | 0.006 | 0.023 | — | — | — | — | 0.044 | 0.0035 | 0.0014 | — | — | — | " |
| 28 | 0.75 | 0.33 | 0.77 | 0.032 | 0.007 | 0.039 | — | — | — | — | 0.029 | 0.0045 | 0.0017 | — | — | — | Comparative |
| 29 | 0.74 | 0.36 | 0.86 | 0.022 | 0.017 | 0.039 | — | — | — | — | 0.035 | 0.0040 | 0.0015 | — | — | — | " |
| 30 | 0.75 | 0.31 | 0.87 | 0.019 | 0.011 | 0.030 | — | — | — | — | 0.033 | 0.0040 | 0.0012 | — | — | — | This Invention |
| 31 | 0.76 | 0.33 | 0.80 | 0.015 | 0.007 | 0.022 | — | — | — | — | 0.030 | 0.0039 | 0.0011 | — | — | — | " |
| 32 | 0.71 | 0.36 | 0.77 | 0.022 | 0.007 | 0.029 | — | — | — | — | 0.027 | 0.0119 | 0.0011 | — | — | — | Comparative |
| 33 | 0.72 | 0.35 | 0.84 | 0.020 | 0.007 | 0.027 | — | — | — | — | 0.022 | 0.0042 | 0.0047 | — | — | — | " |
| 34 | 0.73 | 0.38 | 0.84 | 0.019 | 0.009 | 0.028 | — | — | — | — | 0.019 | 0.0040 | 0.0015 | — | — | — | This Invention |
| 35 | 0.72 | 0.37 | 0.85 | 0.019 | 0.008 | 0.027 | — | — | — | — | 0.020 | 0.0039 | 0.0017 | — | — | — | " |
| 36 | 0.71 | 0.34 | 0.80 | 0.020 | 0.005 | 0.025 | — | — | — | — | 0.027 | 0.0030 | 0.0011 | — | — | — | " |
| 37 | 0.72 | 0.32 | 0.81 | 0.017 | 0.007 | 0.024 | 1.10 | — | — | — | 0.022 | 0.0035 | 0.0010 | — | — | — | " |
| 38 | 0.72 | 0.35 | 0.82 | 0.019 | 0.004 | 0.023 | — | — | — | — | 0.025 | 0.0031 | 0.0012 | — | — | — | " |
| 39 | 0.73 | 0.33 | 0.81 | 0.017 | 0.005 | 0.022 | — | 0.11 | — | — | 0.024 | 0.0029 | 0.0013 | — | — | — | " |
| 40 | 0.71 | 0.32 | 0.83 | 0.021 | 0.005 | 0.026 | — | — | — | — | 0.026 | 0.0034 | 0.0014 | — | — | — | " |
| 41 | 0.73 | 0.31 | 0.84 | 0.019 | 0.004 | 0.023 | — | — | 0.12 | — | 0.024 | 0.0033 | 0.0013 | — | — | — | " |
| 42 | 0.72 | 0.34 | 0.79 | 0.017 | 0.007 | 0.024 | — | — | — | — | 0.027 | 0.0032 | 0.0011 | — | — | — | " |
| 43 | 0.71 | 0.33 | 0.81 | 0.016 | 0.008 | 0.024 | — | — | — | 0.05 | 0.024 | 0.0034 | 0.0012 | — | — | — | " |
| 44 | 0.73 | 0.38 | 0.80 | 0.019 | 0.009 | 0.028 | — | — | — | — | 0.019 | 0.0040 | 0.0015 | — | 0.2 | — | This Invention |
| 45 | 0.72 | 0.37 | 0.82 | 0.017 | 0.008 | 0.025 | — | — | — | — | 0.020 | 0.0035 | 0.0017 | — | 1.1 | — | Comparative |
| 46 | 0.72 | 0.34 | 0.79 | 0.017 | 0.007 | 0.024 | — | — | — | — | 0.027 | 0.0032 | 0.0011 | 0.10 | 0.07 | — | This Invention |
| 47 | 0.71 | 0.33 | 0.80 | 0.016 | 0.008 | 0.024 | — | — | — | — | 0.025 | 0.0034 | 0.0012 | — | 0.09 | — | Comparative |
| 48 | 0.71 | 0.30 | 0.82 | 0.020 | 0.005 | 0.025 | — | — | — | — | 0.026 | 0.0034 | 0.0014 | — | 0.11 | 0.07 | This Invention |
| 49 | 0.70 | 0.31 | 0.80 | 0.019 | 0.004 | 0.023 | — | — | — | — | 0.024 | 0.0033 | 0.0013 | — | 0.1 | — | Comparative |

TABLE 4

MECHANICAL PROPERTIES

| Steel No. | T.S(kgf/mm$^2$) | Elongation (%) | Fatigue strength (kgf/mm$^2$) | Endurance ratio | Torsion repeating number | Fracture defective ratio* | Remarks |
|---|---|---|---|---|---|---|---|
| 25 | 117 | 6.7 | 22.7 | 0.194 | 22 | 20 | Comparative |
| 26 | 197 | 6.0 | 44 | 0.223 | 24 | 15 | This Invention |
| 27 | 215 | 5.7 | 47 | 0.219 | 23 | 20 | " |
| 28 | 185 | 6.5 | 37 | 0.200 | 20 | 70 | Comparative |
| 29 | 184 | 6.2 | 32 | 0.174 | 21 | 55 | " |
| 30 | 186 | 6.7 | 41 | 0.220 | 22 | 20 | This Invention |
| 31 | 187 | 6.1 | 42 | 0.224 | 23 | 25 | " |
| 32 | 183 | 6.9 | 40 | 0.218 | 26 | 90 | Comparative |
| 33 | 185 | 6.7 | 40 | 0.216 | 24 | 70 | " |
| 34 | 186 | 6.2 | 40 | 0.215 | 26 | 15 | This Invention |
| 35 | 185 | 6.3 | 40 | 0.216 | 25 | 10 | " |
| 36 | 183 | 6.0 | 40 | 0.219 | 21 | 20 | " |
| 37 | 198 | 7.7 | 44 | 0.222 | 30 | 15 | " |
| 38 | 182 | 6.1 | 40 | 0.220 | 20 | 15 | " |
| 39 | 194 | 8.0 | 44 | 0.226 | 29 | 15 | " |
| 40 | 184 | 6.1 | 40 | 0.217 | 23 | 20 | " |
| 41 | 191 | 7.0 | 42 | 0.220 | 22 | 0 | " |
| 42 | 183 | 6.2 | 40 | 0.219 | 20 | 20 | " |
| 43 | 190 | 7.5 | 42 | 0.221 | 25 | 0 | " |
| 44 | 194 | 7.7 | 44 | 0.226 | 27 | 15 | This Invention |
| 45 | 174 | 4.2 | 37 | 0.212 | 12 | 70 | Comparative |
| 46 | 187 | 8.0 | 42 | 0.224 | 29 | 0 | This Invention |
| 47 | 183 | 6.2 | 40 | 0.219 | 25 | 20 | Comparative |
| 48 | 189 | 8.0 | 43 | 0.228 | 28 | 0 | This Invention |
| 49 | 181 | 6.0 | 37 | 0.204 | 24 | 20 | Comparative |

NOTE:
*Fracture defective ratio of the 1.5 times diameter winding test

The principles, preferred embodiments and modes of operation of this invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of this invention. Accordingly, it is expressly intended what all such variations and changes which fall within the spirit and scope of this invention as defined in the claims be embraced thereby.

What is claimed is:

1. In an aluminum conductor, steel reinforced, including a stranded steel wire core, the improvement wherein the stranded steel core includes a galvanized high strength steel wire which consists, by weight, essentially of:
C: 0.4–1.2%,
Mn: not more than 2.0%,
Cr: 0–5.0%,
Ni: 0–1.0%,
Nb: 0–0.2%,
Zr: 0–0.2%,
Si: an amount effective to improve fatigue properties and high temperature strength and not more than 2.0%,
Al: not more than 0.1%,
Cu: 0–1.0%,
V: 0–0.5%,
Ti: 0–0.2%,
with the balance iron with incidental impurities of which the amounts of P, S, N and oxygen are:
P: not more than 0.025%,
P+S: not more than 0.03%,
S: not more than 0.015%,
N: not more than 0.010%, and
Oxygen: not more than 0.004%.

2. The improved aluminum conductor, steel reinforced, of claim 1, in which the galvanized high strength steel wire has a tensile strength of 180 kgf/mm$^2$ or more and a fatigue strength of 40 kgf/mm$^2$ or more, and in which
C: 0.6–1.2%,
N: not more than 0.005%, and
Oxygen: not more than 0.002%.

3. The improved aluminum conductor, steel reinforced, of claim 1, in which the galvanized high strength steel wire has an oxygen content of not more than 0.0016%.

4. The improved aluminum conductor, steel reinforced, of claim 1, in which the galvanized high strength steel wire has a thickness of an Fe-Zn alloy layer formed on the surface of the wire of not more than 15 μm.

* * * * *